United States Patent
Ren et al.

(10) Patent No.: US 12,048,279 B2
(45) Date of Patent: Jul. 30, 2024

(54) **SEED DEVELOPMENT DEVICE FOR *PSAMMOCHLOA VILLOSA* USING CONDENSATE WATER IN DESERT AREAS**

(71) Applicant: Northwest Institute of Eco-Environment and Resources, CAS, Lanzhou (CN)

(72) Inventors: Heng Ren, Lanzhou (CN); Wenzhi Zhao, Lanzhou (CN); Yanli Zhuang, Lanzhou (CN); Hai Zhou, Lanzhou (CN); Qiyue Yang, Lanzhou (CN); Weicheng Luo, Lanzhou (CN); Jun Du, Lanzhou (CN); Zhitao Wang, Lanzhou (CN)

(73) Assignee: Northwest Institute of Eco-Environment and Resources, CAS, Lanzhou (CN)

( * ) Notice: Subject to any disclaimer, the term of this patent is extended or adjusted under 35 U.S.C. 154(b) by 0 days.

(21) Appl. No.: 18/523,823

(22) Filed: Nov. 29, 2023

(65) Prior Publication Data
US 2024/0188509 A1      Jun. 13, 2024

(30) Foreign Application Priority Data
Dec. 12, 2022    (CN) .......................... 202211588662.6

(51) Int. Cl.
*A01G 9/24*      (2006.01)
*A01G 9/029*     (2018.01)
*F24F 140/30*    (2018.01)

(52) U.S. Cl.
CPC ................................. *A01G 9/0293* (2018.02)

(58) Field of Classification Search
CPC . A01G 9/00; A01G 27/00; A01G 9/02; A01G 9/14; A01G 9/24; A01G 2009/248; F25D 21/14; F25D 2321/14; F25D 2321/144; F25D 2321/146
See application file for complete search history.

(56) References Cited

U.S. PATENT DOCUMENTS

| | | | | |
|---|---|---|---|---|
| 4,315,599 | A * | 2/1982 | Biancardi | A01G 25/00 239/128 |
| 5,233,843 | A * | 8/1993 | Clarke | B01D 53/263 62/93 |
| 5,601,236 | A * | 2/1997 | Wold | A01G 29/00 239/69 |

(Continued)

*Primary Examiner* — Kristen C Hayes

(57) ABSTRACT

A seed development device for *Psammochloa villosa* using condensate water in desert areas includes: a cultivation box, a top surface of the cultivation box is connected to a cooler and condensate water collecting units through a support frame. Each condensate water collecting unit includes an outer frame, sleeve pipes, a middle frame, a cold air cavity, water collecting rods, a water collecting tank and a delivery pipe. The delivery pipe is connected to the cultivation box. When an outdoor temperature cannot complete condensation of water vapor, the cooler completes cooling of the cold air cavity and water collecting rods until condensate water collection is completed, water drops fall into the water collecting tank to complete water collection, which is used for water supplement of seed development of *Psammochloa villosa*, thus reducing the process of artificial water supplement and improving the development efficiency of seeds of *Psammochloa villosa* in desert areas.

10 Claims, 4 Drawing Sheets

(56) References Cited

U.S. PATENT DOCUMENTS

| | | | | |
|---|---|---|---|---|
| 6,553,713 | B2* | 4/2003 | Chiu | A01G 23/00 47/20.1 |
| 7,467,523 | B2* | 12/2008 | Vetrovec | C02F 1/14 96/108 |
| 9,227,149 | B2* | 1/2016 | Boudeman | B01D 53/265 |
| 2020/0187437 | A1* | 6/2020 | Zhou | A01G 25/00 |

* cited by examiner

SEED DEVELOPMENT DEVICE FOR *PSAMMOCHLOA VILLOSA* USING CONDENSATE WATER IN DESERT AREAS

TECHNICAL FIELD

The disclosure relates to the technical field of seed development of *Psammochloa villosa* in desert areas, and particularly to a seed development device for *Psammochloa villosa* using condensate water in desert areas.

BACKGROUND

*Psammochloa villosa* is a typical xerophytic and psammophytic gramineous plant. It has strong adaptability to flowing dunes and is the dominant species of sandy floras. It is widely distributed in the western part of the Otindag Sandy Land of Inner Mongolia, the Kubuqi Desert, the Badain Jaran Desert, the Mu Us Desert, and the sand of the Hexi Corridor in Gansu; and the distribution pattern of single-species patches, or the mosaic pattern of patchy vegetation patches and quicksand patches is a unique natural landscape in desert areas. At present, there are relatively few studies on *Psammochloa villosa*, mainly concentrated in semi-arid areas with relatively abundant precipitation. It is relatively rare in arid areas such as Badain Jaran Desert and Hexi Corridor in Gansu with precipitation of about 100 mm, especially the technology of desert control using *Psammochloa villosa* transplantation has not been reported.

Since *Psammochloa villosa* is mostly single-species flora in desert areas, multi-level roots are mainly distributed on rhizomes, and the water content of rhizomes and roots is low, so *Psammochloa villosa* is usually planted in desert areas by seed development and transplantation, but the desert areas have less natural precipitation, during seed development of *Psammochloa villosa*, artificial water supplement is needed regularly, which affects the efficiency of seed development of *Psammochloa villosa*.

Based on this, a seed development device for *Psammochloa villosa* using condensate water in desert areas is proposed.

SUMMARY

The disclosure provides a seed development device for *Psammochloa villosa* using condensate water in desert areas to solve the problem raised in the above background technology.

To achieve the above objective, technical solutions adopted by the disclosure are as follows.

A seed development device for *Psammochloa villosa* using condensate water in desert areas includes: a cultivation box; a top plate is connected to a top surface of the cultivation box in a snap-fit manner, a support frame is fixed to a middle of an upper surface of the top plate, a cooler is fixed to an upper end of the support frame, and multiple condensate water collecting units are movably connected to two ends of the cooler.

Each condensate water collecting unit includes: an outer frame, sleeve pipes, a middle frame, a cold air cavity, water collecting rods, a water collecting tank, and a delivery pipe; the outer frame is a rectangular frame, each side of the outer frame is provided with two sleeve pipes; the sleeve pipes of adjacent two condensate water collecting units are connected with each other in a sleeved manner, and the sleeve pipes of the condensate water collecting units proximate to the cooler are connected to two sides of the cooler in a sleeved manner; the middle frame is fixed at a middle of the outer frame, the cold air cavity is fixed in the middle frame, the water collecting rods are symmetrically disposed on two outer sides of the cold air cavity in a shape of an inverted cone with a big top and a small bottom; and the water collecting tank is fixed at a bottom of the middle frame, the flexible delivery pipe is fixed at a bottom of the water collecting tank, and a bottom of the delivery pipe is connected to the top of the cultivation box and an inner cavity of the cultivation box.

In an embodiment, the cultivation box is divided into a seed cultivation cavity at bottom and a diversion cavity at top by a baffle plate, and a bottom of the delivery pipe is connected to the diversion cavity.

In an embodiment, the diversion cavity is provided with a sand filter layer therein, and the baffle plate is provided with drip holes for connecting a bottom of the diversion cavity with the seed cultivation cavity, and each drip hole is a conical hole with a big top and a small bottom.

In an embodiment, a top end of an outer side of the cultivation box proximate to the seed cultivation cavity defines multiple air holes, and each air hole is provided with an on-off valve.

In an embodiment, the support frame includes: a bottom frame and a support sleeve, the bottom frame is fixed at a middle of the top surface of the cultivation box, and the support sleeve is sleeved on the bottom frame, and an outer side of the support sleeve is provided with a threaded pin.

In an embodiment, the cooler is a direct-current (DC) electric cooler, a top surface of the cooler is provided with a solar panel, a top of the support frame is provided with a battery, the solar panel is configured to charge the battery, and the battery is configured to supply power to the cooler to complete a cooling work of the DC electric cooler.

In an embodiment, an outer side of the cooler is provided with connecting pipes, and the sleeve pipes of the condensate water collecting units proximate to the cooler are sleeved inside the connecting pipes of the cooler, and each sleeve pipe is provided with an anti-drop ring.

In an embodiment, outer sides of the two outermost condensate water collecting units are respectively fixed with protective plates, bottom ends of the protective plates are rotationally connected to support plates, respectively; and bottom ends of the support plates are rotationally connected to two sides of the top plate at the top of the cultivation box.

In an embodiment, each support plate includes: two rectangular cavity plates that are sleeved with each other, and threaded pins for fixing are provided at sleeved positions of the two rectangular cavity plates.

In an embodiment, a top of the cold air cavity is provided with a cold air inlet configured to communicate with a cold air end of the cooler; and each water collecting rod is a hollow copper pipe or hollow aluminum pipe with an exhaust hole, and an area of a cross-section of the water collecting tank is not less than a maximum area expanded by the topmost water collecting rods.

Compared with the prior art, the disclosure has the following advantages.

The disclosure configures the cooler and multiple condensate water collecting units on the cultivation box, when in use, the seeds of *Psammochloa villosa* are placed in the seed cultivation cavity, and then the whole device is moved to a desert area where the air is humid, the support plates are expanded, the height of the support frame is adjusted until the cooler is at an appropriate height, and the height of the support frame is locked; the condensate water collecting units are expanded in turn until the outermost condensate water collecting units are expanded, and the length of the support plates is locked, so that the installation and use of the device can be completed. When an outdoor temperature is low, the water vapor in the air can naturally condense on the cold air cavity or the outer surface of the water collecting rod, which is beneficial to condensate water collection at natural temperature. When the outdoor temperature is not enough to complete the condensation of water vapor in the air on the cold air cavity or the outer surface of the water collecting rod, the cooler is turned on, and the cooling of the cold air cavity and the water collecting rods is completed by the cooler until the natural condensation and water collecting function can be completed. When the water in the air is condensed and collected on the surface of the water collecting rod or the cold air cavity, with the increase of the condensate water collection quantity, the water drops naturally fall into the water collecting tank. The flexible delivery pipe is fixed at the bottom of the water collecting tank, and the bottom of the delivery pipe is communicated with the top of the cultivation box and the diversion cavity, and the sand filter layer is disposed in the diversion cavity. After the sand in the collected water drops is filtered by the sand filter layer, the water drops are sent into the seed cultivation cavity through the drip holes for water supplement of the seed development (i.e., cultivation) of *Psammochloa villosa*, which can be used for a long time until the seed development of *Psammochloa villosa* in the cultivation box is completed. The process of artificial water supplement is reduced, and the development efficiency of seeds of *Psammochloa villosa* in desert areas is improved.

DESCRIPTION OF REFERENCE NUMERALS

1—cultivation box; 11—seed cultivation cavity; 12—diversion cavity; 13—air hole; 14—baffle plate; 15—drop hole; 2—support frame; 21—bottom frame; 22—support sleeve; 3—cooler; 31—solar panel; 32—connecting pipe; 33—temperature sensor; 34—T-shaped pipe; 35—connecting joint; 4—condensate water collecting unit; 41—outer frame; 42—sleeve pipe; 43—middle frame; 44—cold air cavity; 45—water collecting rod; 46—water collecting tank; 47—delivery pipe; 48—cold air inlet; 5—protective plate; 6—support plate.

DETAILED DESCRIPTION OF EMBODIMENTS

The following will provide a clear and complete description of the technical solutions in the embodiments of the disclosure, in conjunction with the accompanying drawings. Apparently, the described embodiments are only a part of the embodiments of the disclosure, not all of them. Based on the embodiments in the disclosure, all other embodiments obtained by those skilled in the art without creative labor fall within the scope of protection of the disclosure.

Figure 1:
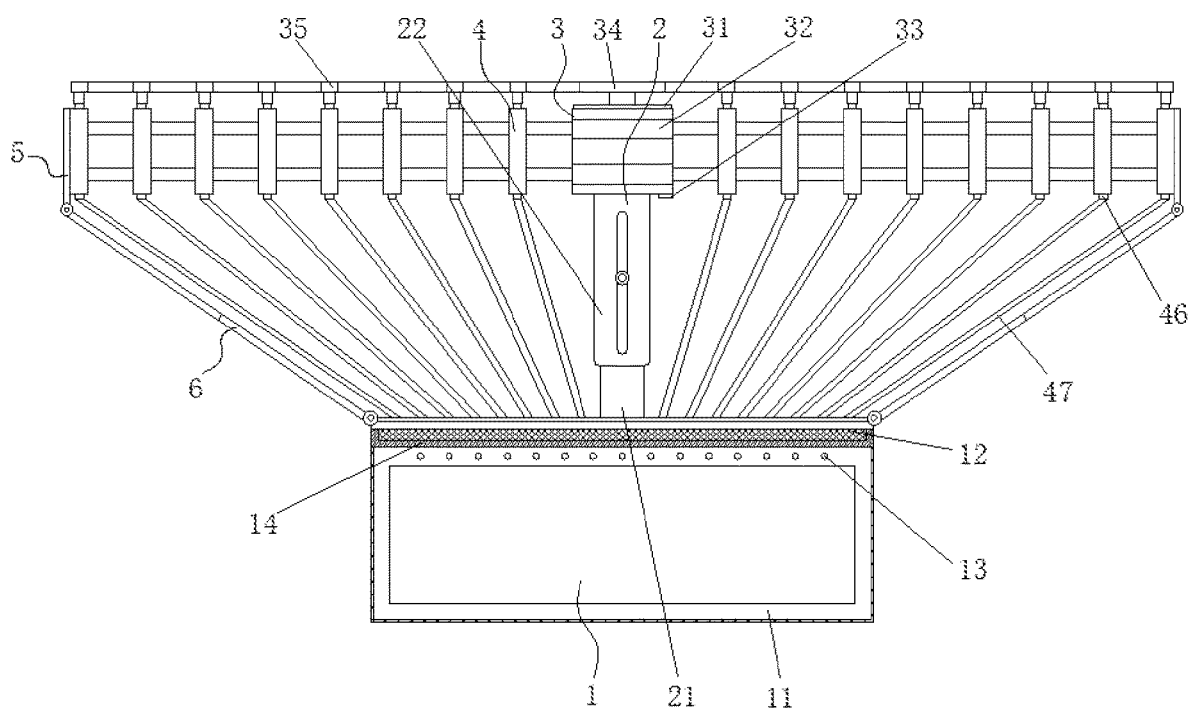
FIG. 1 illustrates a schematic structural diagram of a seed development device for *Psammochloa villosa* using condensate water in desert areas according to an embodiment of the disclosure.
Figure 2:
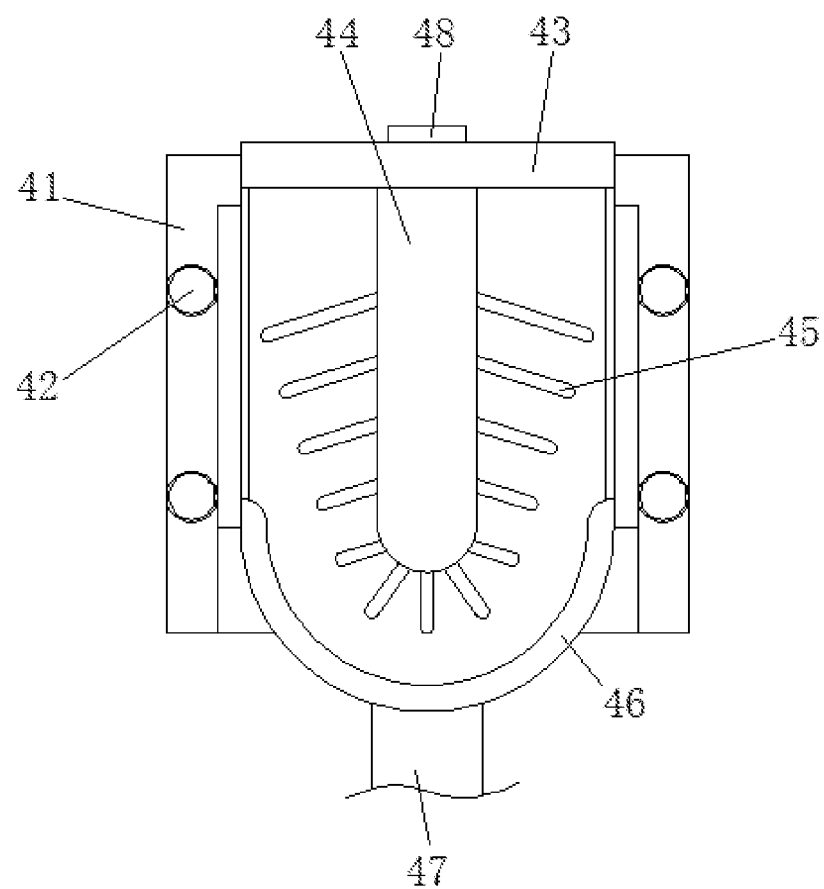
FIG. 2 illustrates a front view of a water collecting unit according to an embodiment of the disclosure.
Figure 3:
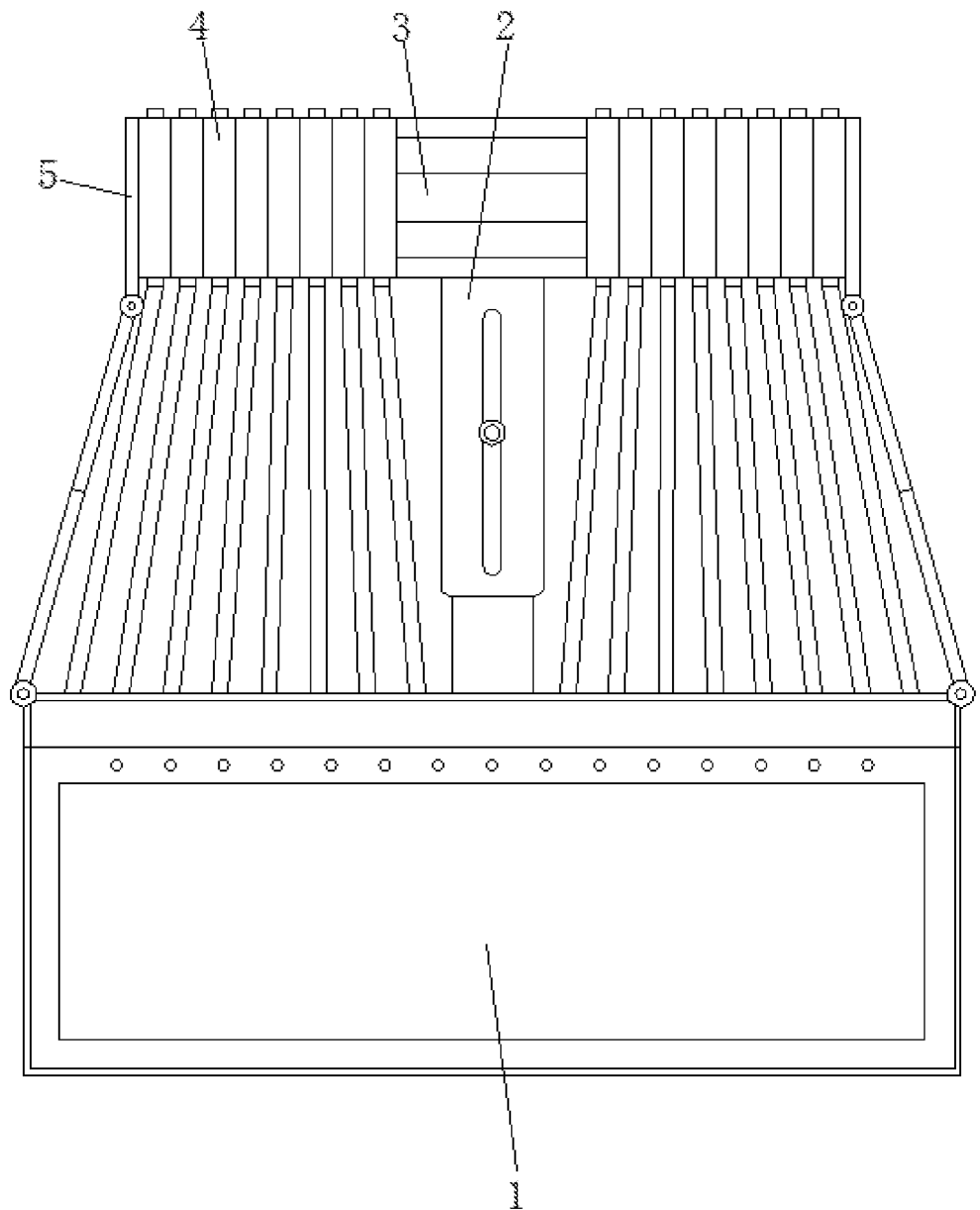
FIG. 3 illustrates a schematic structural diagram of the seed development device for *Psammochloa villosa* using condensate water in desert areas at a folded state according to an embodiment of the disclosure.
Figure 4:
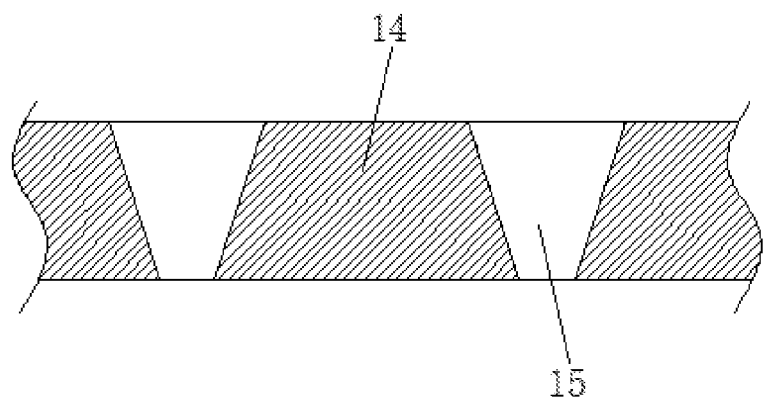
FIG. 4 illustrates a schematic structural diagram of drop holes of a baffle plate according to an embodiment of the disclosure.

As shown in FIGS. 1 to 3, the disclosure provides the following technical solution. A seed development device for *Psammochloa villosa* using condensate water in desert areas includes: a cultivation box 1. The cultivation box 1 is composed of four side plates and a bottom plate, which can be snapped and assembled in desert areas. The cultivation box 1 is divided into a seed cultivation cavity 11 at bottom and a diversion cavity 12 at top by a baffle plate 14. The seed cultivation cavity 11 is configured to place seeds of *Psammochloa villosa*. A bottom of a delivery pipe 47 is connected to the diversion cavity 12. The water collected by condensate water collecting units 4 is transmitted into the diversion cavity 12 through the delivery pipe 47. The diversion cavity 12 is provided with a sand filter layer therein, the baffle plate 14 is provided with drip holes 15 for communicating the bottom of the diversion cavity 12 with the seed cultivation cavity 11, after the sand is filtered by the sand filter layer, the collected water is sent into the seed cultivation cavity 11 through the drip holes 15 for water supplement of the seed development of *Psammochloa villosa*.

Each drip hole 15 is a conical hole with a big top and a small bottom. The drip hole 15 can reduce the evaporation area of the water in the seed cultivation cavity 11 when the collected water normally flows into the seed cultivation cavity 11, thereby avoiding the loss of the collected water and improving the utilization rate of the collected water.

The top end of the outer side of the cultivation box 1 proximate to the seed cultivation cavity 11 defines multiple air holes 13, and each air hole 13 is provided with an on-off valve. The air exchange can be carried out in the seed cultivation cavity 11 through the air holes 13.

The top surface of the cultivation box 1 is connected to a top plate in a snap-fit manner, a support frame 2 is fixed to the middle of the upper surface of the top plate, the support frame 2 includes: a bottom frame 21 and a support sleeve 22, the bottom frame 21 is fixed at the middle of the top surface of the cultivation box 1, the support sleeve 22 is sleeved on the bottom frame 21, and an outer side of the support sleeve 22 is provided with a threaded pin. The adjustment of the overall height of the support frame 2 is completed by adjusting the mutual sleeving length of the bottom frame 21 and the support sleeve 22 of the support frame 2, so that it is convenient to configure the cooler 3 and the condensate water collecting units 4 at a height suitable for collecting water.

The cooler 3 is fixed to the top of the support frame 2. The cooler 3 is a direct-current (DC) electric cooler, a top surface of the cooler 3 is provided with a solar panel 31, a top of the support frame 2 is provided with a battery, the solar panel 31 is configured to charge the battery, and the battery is configured to supply power to the cooler 3 to complete a cooling work of the DC electric cooler. A bottom side of the cooler 3 is provided with a temperature sensor 33 connected to a controller of the cooler 3, and the temperature sensor 33 is configured to collect an environmental temperature to obtain temperature information and transmit the temperature information to the controller of the cooler 3. When the outside temperature is not enough to complete the collection of condensate water in the condensate water collecting units 4, the cooler 3 provides active cooling to the condensate water collecting units 4, which broadens the outdoor temperature range of the condensate water collecting units 4.

The two ends of the cooler 3 are movably connected to multiple condensate water collecting units 4, each condensate water collecting unit 4 includes: an outer frame 41, sleeve pipes 42, a middle frame 43, a cold air cavity 44, water collecting rods 45, a water collecting tank 46, and a delivery pipe 47. The outer frame 41 is a rectangular frame, and each of two sides of the outer frame 41 is provided with two sleeve pipes 42. The sleeve pipes 42 of adjacent two condensate water collecting units 4 are connected with each other in a sleeved manner, and the sleeve pipes 42 of the condensate water collecting units 4 proximate to the cooler 3 are connected to two sides of the cooler 3 in a sleeved manner. Specifically, an outer side of the cooler 3 is provided with connecting pipes 32, the sleeve pipes 42 of the condensate water collecting units 4 proximate to the cooler 3 are sleeved inside the connecting pipes 32 of the cooler 3, and each sleeve pipe 42 is provided with an anti-drop ring. The condensate water collecting units 4 are pulled out sequentially through protective plates 5, because the sleeve pipes 42 of the condensate water collecting units 4 proximate to the cooler 3 are sleeved in the connecting pipes 32 of the cooler 3, and the anti-drop rings are respectively disposed in the sleeve pipes 42, a distance between two adjacent condensate water collecting units 4 is a maximum pulling length of the sleeve pipes 42. As shown in FIG. 1, when all the condensate water collecting units 4 on two sides are pulled out, the condensate water collecting units 4 are arranged at two sides of the cooler 3 at equal intervals. As shown in FIG. 3, the condensate water collecting units 4 are sequentially sleeved after use, which can not only expand the water collection coverage space during use, but also reduce the space occupation after use, which is beneficial to use.

The middle of the outer frame 41 is fixed with the middle frame 43. The cold air cavity 44 is fixed in the middle frame 43, the multiple water collecting rods 45 are symmetrically disposed on two outer sides of the cold air cavity 44 in the shape of the inverted cone with the big top and the small bottom, and the water collecting tank 46 is fixed at a bottom of the middle frame 43. The top of the cold air cavity 44 is provided with a cold air inlet 48 for communicating with a cold air end of the cooler 3, and the cold air end of the cooler 3 is connected with a T-shaped pipe 34. The two sides of the T-shaped pipe 34 are connected with multiple interconnected connecting joints 35, each connecting joint is a three-way pipe, the top ends of the connecting joints 35 are sleeved with each other, and a bottom end of each connecting joint 35 is connected with the cold air inlet 48. The sides of the innermost two communicating joints 35 proximate to the T-shaped pipe 34 are sleeved in the T-shaped pipe 34, and the outer ends of the outermost two communicating joints 35 are in a closed state, so that the cold air cavity 44 can be actively cooled through the cooler 3, which broadens the applicable temperature range of outdoor water collection.

The multiple water collecting rods 45 are symmetrically disposed on two outer sides of the cold air cavity 44 in the shape of the inverted cone with the big top and the small bottom, so that the area in contact with air is the maximum area, and the collection area of condensate water is improved. Each water collecting rod 45 is a hollow copper pipe or hollow aluminum pipe with an exhaust hole, which is beneficial to the operation of condensate water collection; after water in the air is condensed and collected on the surface of the water collecting rod 45 or the cold air cavity 44, water drops naturally fall into the water collecting tank 46 with the increase of the collected condensate water. The area of a cross-section of the water collecting tank 46 is not less than a maximum area expanded by the topmost water collecting rods 45, which is beneficial to collecting the falling water drops. The delivery pipe 47 is fixed at the bottom of the water collecting tank 46, the bottom of the delivery pipe 47 is communicated with the diversion cavity 12, and the water collected by the condensate water collecting units 4 is sent into the diversion cavity 12 through the delivery pipe 47.

In order to facilitate the use, outer sides of the two outermost condensate water collecting units 4 are respectively fixed with protective plates 5, and bottom ends of the protective plates 5 are rotationally connected to support plates 6, respectively. Each support plate 6 includes: two rectangular cavity plates that are sleeved with each other, and threaded pins for fixing are provided at sleeved positions of the two rectangular cavity plates. The bottom ends of the support plates 6 are rotationally connected to two sides of the top plate at the top surface of the cultivation box 1. So that after the condensate water collecting units 4 are unfolded (i.e., expanded), the support plates 6 can be adjusted to a suitable length to assist in completing the horizontal support function of the condensate water collecting units 4, which improves the service life of the device.

To sum up, when in use, the seeds of *Psammochloa villosa* are placed in the seed cultivation cavity 11, and then the whole device is moved to a desert area where the air is humid, the support plates 6 are expanded, the height of the support frame 2 is adjusted until the cooler 3 is at an appropriate height, and the height of the support frame 2 is locked.

Then, the condensate water collecting units 4 are expanded in turn until the outermost condensate water collecting units 4 are expanded, and the length of the support plates 6 is locked, so that the installation and use of the device can be completed.

When the outdoor temperature is low, the water vapor in the air can naturally condense on the cold air cavity 44 or the outer surface of the water collecting rod 45, which is beneficial to condensate water collection at natural temperature. When the outdoor temperature is not enough to complete the condensation of water vapor in the air on the cold air cavity 44 or the outer surface of the water collecting rod 45, the cooler 3 is turned on, and the cooling of the cold air cavity 44 and the water collecting rods 45 is completed by the cooler 3 until the natural condensation and water collecting function can be completed.

When the water in the air is condensed and collected on the surface of the water collecting rod 45 or the cold air cavity 44, with the increase of the condensate water collection quantity, the water drops naturally fall into the water collecting tank 46. The flexible delivery pipe 47 is fixed at the bottom of the water collecting tank 46, the bottom of the delivery pipe 47 is communicated with the top of the cultivation box 1 and the diversion cavity 12, and the sand filter layer is disposed in the diversion cavity 12. After the sand in the collected water drops is filtered by the sand filter layer, the water drops are sent into the seed cultivation cavity 11 through the drip holes 15 for water supplement of the seed development of *Psammochloa villosa*, which can be used for a long time until the seed development of *Psammochloa villosa* in the cultivation box 1 is completed. When the seeds of *Psammochloa villosa* germinate and form a stable plant cluster, the top plate snapped on the top surface of the cultivation box 1 is removed first, and then the side plates of the cultivation box 1 are removed in turn. At last, after the bottom plate is removed, the device can be recovered. Using this device, the process of artificial water supplement is reduced, and the development efficiency of seeds of *Psammochloa villosa* in desert areas is improved.

It should be noted that in this paper, relational terms such as first and second are only used to distinguish one entity or operation from another entity or operation, and do not necessarily require or imply that there is any such actual relationship or order between these entities or operations. Moreover, the terms "contain", "include" or any other variation thereof are intended to cover non-exclusive inclusion, so that a process, method, article or equipment including a series of elements includes not only those elements, but also other elements not explicitly listed or elements inherent to such process, method, article or equipment.

Although embodiments of the disclosure have been shown and described, it will be understood by those skilled in the art that various changes, modifications, substitutions and variations can be made to these embodiments without departing from the principles and spirit of the disclosure, the scope of which is defined by the appended claims and their equivalents.

What is claimed is:

1. A seed development device for *Psammochloa villosa* using condensate water in desert areas, comprising:
   a cultivation box (1);
   a baffle plate (14), disposed in the cultivation box (1); wherein the cultivation box (1) is divided into a seed cultivation cavity (11) and a diversion cavity (12) by the baffle plate (14), and the diversion cavity (12) is located at a top of the seed cultivation cavity (11);
   a top plate, connected to a top surface of the cultivation box (1) in a snap-fit manner;
   a support frame (2), fixed to a middle of an upper surface of the top plate;
   a cooler (3), fixed to an upper end of the support frame (2); and
   a plurality of condensate water collecting units (4), movably connected to two ends of the cooler (3); wherein each condensate water collecting unit (4) comprises: an outer frame (41), sleeve pipes (42), a middle frame (43), a cold air cavity (44), water collecting rods (45), a water collecting tank (46), and a delivery pipe (47); the outer frame (41) is a rectangular frame, each of two sides of the outer frame (41) is provided with two of the sleeve pipes (42); the sleeve pipes (42) of adjacent two condensate water collecting units (4) are connected with each other in a sleeved manner, and the sleeve pipes (42) of the condensate water collecting units (4) proximate to the cooler (3) are connected to two sides of the cooler (3) in a sleeved manner; the cold air cavity (44) is fixed in the middle frame (43), the water collecting rods (45) are symmetrically disposed on two outer sides of the cold air cavity (44) in a shape of an inverted cone with a big top and a small bottom; and the water collecting tank (46) is fixed at a bottom of the middle frame (43), the delivery pipe (47) is fixed at a bottom of the water collecting tank (46), and a bottom of the delivery pipe (47) is connected to the diversion cavity (12).

2. The seed development device for *Psammochloa villosa* using condensate water in desert areas as claimed in claim 1, wherein the diversion cavity (12) is provided with a sand filter layer therein, and the baffle plate (14) is provided with drip holes (15) for connecting a bottom of the diversion cavity (12) with the seed cultivation cavity (11), and each drip hole (15) is a conical hole with a big top and a small bottom.

3. The seed development device for *Psammochloa villosa* using condensate water in desert areas as claimed in claim 1, wherein a top end of an outer side of the cultivation box (1) proximate to the seed cultivation cavity (11) defines a plurality of air holes (13), and each air hole (13) is provided with an on-off valve.

4. The seed development device for *Psammochloa villosa* using condensate water in desert areas as claimed in claim 1, wherein the support frame (2) comprises a bottom frame (21) and a support sleeve (22), the bottom frame (21) is fixed at a middle of the top surface of the cultivation box (1), and the support sleeve (22) is sleeved on the bottom frame (21), and an outer side of the support sleeve (22) is provided with a threaded pin.

5. The seed development device for *Psammochloa villosa* using condensate water in desert areas as claimed in claim 1, wherein the cooler (3) is a direct-current (DC) electric cooler, a top surface of the cooler (3) is provided with a solar panel (31), a top of the support frame (2) is provided with a battery, the solar panel (31) is configured to charge the battery, and the battery is configured to supply power to the cooler (3) to complete a cooling work of the DC electric cooler; a bottom side of the cooler (3) is provided with a temperature sensor (33) connected to a controller of the cooler (3), and the temperature sensor (33) is configured to collect an environmental temperature to obtain temperature information and transmit the temperature information to the controller of the cooler (3).

6. The seed development device for *Psammochloa villosa* using condensate water in desert areas as claimed in claim 1, wherein an outer side of the cooler (3) is provided with connecting pipes (32), and the sleeve pipes (42) of the condensate water collecting units (4) proximate to the cooler (3) are sleeved inside the connecting pipes (32) of the cooler (3), and each sleeve pipe (42) is provided with an anti-drop ring.

7. The seed development device for *Psammochloa villosa* using condensate water in desert areas as claimed in claim 1, wherein outer sides of the outermost condensate water collecting units (4) of the plurality of condensate water collecting units (4) are respectively fixed with protective plates (5), bottom ends of the protective plates (5) are rotationally connected to support plates (6), respectively; and bottom ends of the support plates (6) are rotationally connected to two sides of the top plate at the top surface of the cultivation box (1).

8. The seed development device for *Psammochloa villosa* using condensate water in desert areas as claimed in claim 7, wherein each support plate (6) comprises: two rectangular cavity plates that are sleeved with each other, and threaded pins for fixing are provided at sleeved positions of the two rectangular cavity plates.

9. The seed development device for *Psammochloa villosa* using condensate water in desert areas as claimed in claim 1, wherein a top of the cold air cavity (44) is provided with a cold air inlet (48) for communicating with a cold air end of the cooler (3), and the cold air end of the cooler (3) is connected with a T-shaped pipe (34); two sides of the T-shaped pipe (34) are respectively connected with multiple interconnected connecting joints (35), and a bottom end of each connecting joint (35) is connected with the cold air inlet (48).

10. The seed development device for *Psammochloa villosa* using condensate water in desert areas as claimed in claim 1, wherein each water collecting rod (45) is a hollow copper pipe or hollow aluminum pipe with an exhaust hole, and an area of a cross-section of the water collecting tank (46) is not less than a maximum area expanded by the topmost water collecting rods (45).

\* \* \* \* \*